United States Patent [19]

Fraser

[11] Patent Number: 4,513,411
[45] Date of Patent: Apr. 23, 1985

[54] TRANSMISSION OF STATUS REPORT OF EQUIPMENT IN A DIGITAL TRANSMISSION NETWORK

[75] Inventor: Alexander G. Fraser, Bernardsville, N.J.

[73] Assignee: AT&T Bell Laboratories, Murray Hill, N.J.

[21] Appl. No.: 413,606

[22] Filed: Sep. 1, 1982

[51] Int. Cl.³ .............................................. H04J 3/14
[52] U.S. Cl. .................................................... 370/13
[58] Field of Search .............................. 370/13, 110.1

[56] References Cited

U.S. PATENT DOCUMENTS

| | | | |
|---|---|---|---|
| 3,668,645 | 6/1972 | Regmond et al. | 370/110.1 |
| 3,686,443 | 8/1972 | Kavanaugh et al. | 370/110.1 |
| 3,839,707 | 10/1974 | Woodward et al. | 370/13 |
| 3,922,495 | 11/1975 | Donohoe | 370/110.1 |
| 3,937,935 | 2/1976 | Le Pabic | 370/13 |
| 3,970,799 | 7/1976 | Colton et al. | 370/110.1 |
| 4,096,354 | 6/1978 | Bleickardt et al. | 370/13 |
| 4,225,753 | 9/1980 | Chown et al. | 370/13 |
| 4,271,506 | 6/1981 | Broc et al. | 370/13 |
| 4,302,836 | 11/1981 | Bouvier d'Ivoire et al. | 370/13 |

FOREIGN PATENT DOCUMENTS 147849 11/1980 Japan ..................................... 370/13

OTHER PUBLICATIONS

T. Kaup, "SMARTI: A Systematic Monitor and Remoter of T-Information", ICC'80, Jun. 1980, 2.3.1–2.3.4.
B. Sandnes, "NORSAT Signalling Methods", Telektronikk, No. 1, 1977, pp. 97–100.
E. Blum et al., "The Design and Application of PCM Signalling Multiplexers", Budavox Telecom, Rev., No. 3, 1979, pp. 1–16.

Primary Examiner—Douglas W. Olms
Assistant Examiner—Wellington Chin
Attorney, Agent, or Firm—Robert O. Nimtz

[57] ABSTRACT

A status report of equipment in a telecommunications network is transmitted automatically from the equipment to the network maintenance center. The status report includes information such as the serial number of the equipment and its location. Based on such a status report, the network maintenance center can keep up-to-date records of where equipment is located, how the equipment is interconnected with other components, and whether that equipment is functioning correctly. Furthermore, a portable test device can be used by a maintenance person to read the status report transmitted on the line and thereby determine the end points of any transmission line.

11 Claims, 6 Drawing Figures

TRANSMISSION OF STATUS REPORT OF EQUIPMENT IN A DIGITAL TRANSMISSION NETWORK

TECHNICAL FIELD

This invention relates to digital transmission networks and, in particular, to the configuration of a transmission path therein.

BACKGROUND OF THE INVENTION

A typical telecommunication network comprises terminal equipment, switching machines, and transmission lines, usually distributed over a wide geographical area. Before the aforesaid network can be used efficiently, it is necessary to know with precision how the component parts are connected.

A network grows by the incremental addition of the aforesaid terminal equipment, switching machines and transmission lines. The hard-wired interconnections between the aforesaid components are constantly being rearranged to take account of changes in traffic patterns and to overcome problems caused by defective equipment.

Consequently, there is a danger that over a period of time no accurate record of network configuration will be kept when manual record keeping is used. Furthermore, the aforesaid rearrangements and record keeping errors accumulate with time; it is not easy to determine by inspection how the component parts of the distributed network are interconnected.

SUMMARY OF THE INVENTION

In accordance with the illustrative embodiment of the present invention, equipment used in the transmission path within a digital network is uniquely identified by transmitting a signature comprising a plurality of bits representing the serial number and the location of the equipment.

More particularly, the information carried by the digital network is transmitted as frames of information bits. The signature bits are multiplexed with a plurality of the aforesaid information frames at the equipment location by combining a signature bit with a frame of information bits.

At a receiving end, the signature bits are demultiplexed from the frames of information bits and the signature bits are transmitted to a maintenance center.

Because only one signature bit is multiplexed with a frame of information bits, the rate of transmission for signature bits is lower than that for information bits. Consequently, the transmission of signature bits uses only a small fraction of the network transmission resources.

In addition, this method can be implemented with low cost components. For example, a circuit comprising a programmable read only memory (PROM) and a counter driven by a low speed oscillator may be used to generate the aforesaid signature. This circuit may be attached to every terminal equipment. Furthermore, the circuit is simple enough that its function could be implemented in a single integrated circuit which may then be conveniently installed within an interface circuit.

Another advantage of the present invention results from the use of a portable test device to detect the signature. The test device may be used to probe a transmission facility and the signature could be visually displayed. The displayed signature may then be reported by a maintenance person to another at the maintenance center. Thereafter, by analyzing the signature at the maintenance center, the physical location of the ends of the transmission facility may be identified. By this means, trouble shooting of plant facilities is enhanced.

Network configuration information may be used by the network control processes in the course of setting up calls in the network. The accuracy and efficiency of this procedure depends on the accuracy and currency of the network configuration information. Thus, another advantage of the present invention results if a network maintenance center uses the signatures to verify and correct the data base of network connectivity and if changes in this data base are transmitted to the network control processes, then the efficiency and the accuracy of circuit establishment is improved.

DETAILED DESCRIPTION

Figure 1:
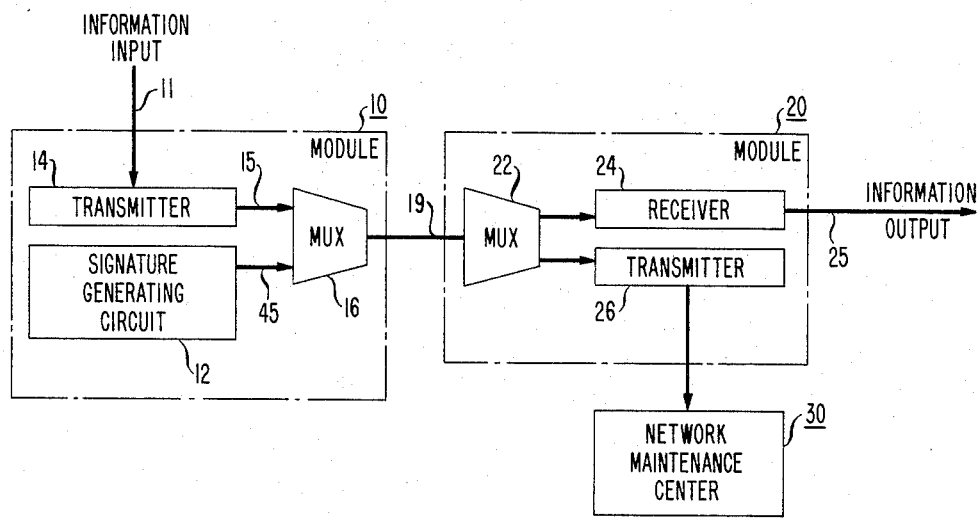
FIG. 1 shows a system for transmitting the signature of an equipment module in a telecommunications network to a maintenance center.

Referring to FIG. 1, there is shown a system for transmitting the signature of an equipment module 10 over transmission line 19 through a receiving module 20 to a network maintenance center 30. The signature of module 10 comprises information, such as its serial number and its location. Equipment module 10 comprises transmitter 14 for transmitting a stream of information bits organized as a plurality of frames which are received on line 11 and transmitted to a multiplexor 16. The signature is generated in circuit 12 and transmitted to multiplexor 16. In the illustrative embodiment, a signature bit is multiplexed at element 16 with a frame of information bits and then transmitted over line 19.

Figure 2:
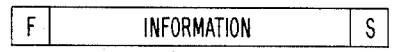
FIG. 2 shows a frame of information bits derived by multiplexing a signature bit with a frame of data bits.

Referring to FIG. 2, there is shown the signature bit S, information bits, and the frame bit F. If the transmission scheme is a T-1 carrier system, for example, there will be a frame comprising 194 bits: one signature bit, 192 information bits, and one frame bit.

Figure 3:
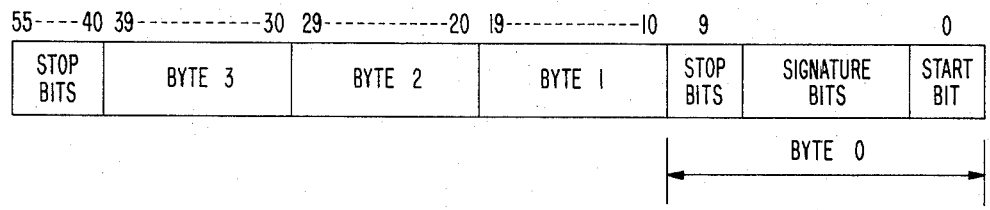
FIG. 3 shows the format of the aforesaid signature.

Referring to FIG. 3, there is shown one format for the signature. This format comprises four bytes, 0, 1, 2 and 3, followed by a plurality of stop bits. Each byte has ten bits: a start bit, eight signature bits, and a stop bit. The signature comprises fifty-six bits in the illustrative embodiment: sixteen stop bits, 40,41,42 . . . 55 and four bytes each having ten bits.

Returning to FIG. 1, the multiplexed bits are received over line 19 at module 20. The stream of information bits is demultiplexed at multiplexor 22: the data stream is transmitted from receiver 24 over line 25 to a utilization means, and the signature bits are passed serially through transmitter 26 to the network maintenance center 30.

Figure 4:
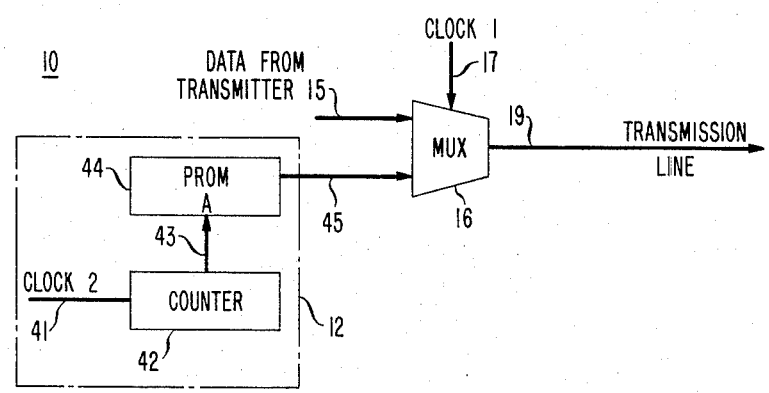
FIG. 4 shows details of the equipment module in FIG. 1 used for transmitting the signature bits to the maintenance center.

Referring to FIG. 4, there is shown the details of the signature generating circuit 12 of FIG. 1. A clock signal, clock$_2$, at a rate of 300 cycles per second is supplied over lead 41 to counter 42. Thus, counter 42 is clocked 300 times a second. Counter 42 has a range from 0 to 55, corresponding to the fifty-six signature bits stored in the programmable read only memory (PROM) 44.

In response to a clock signal on lead 41, counter 42 is incremented. The output signal from counter 42 is transmitted over its output lead 43 as the address input of the PROM 44. In consequence thereof, a signature bit is read from PROM 44 and transmitted over lead 45 to multiplexor 16. In response to a clock signal, clock$_1$, for example, at a T-1 carrier rate of 8000 cycles per second at lead 17, the multiplexor 16 combines the signature bit on lead 45 and a frame of information bits on lead 15 in a format as shown earlier in FIG. 2.

Because signature bits are transmitted at 300 Kb/s and the T-1 frame rate is 8000 cycles per second in the aforesaid example, each signature bit is repeated 8000/300 times before the next signature bit is transmitted.

Figure 5:
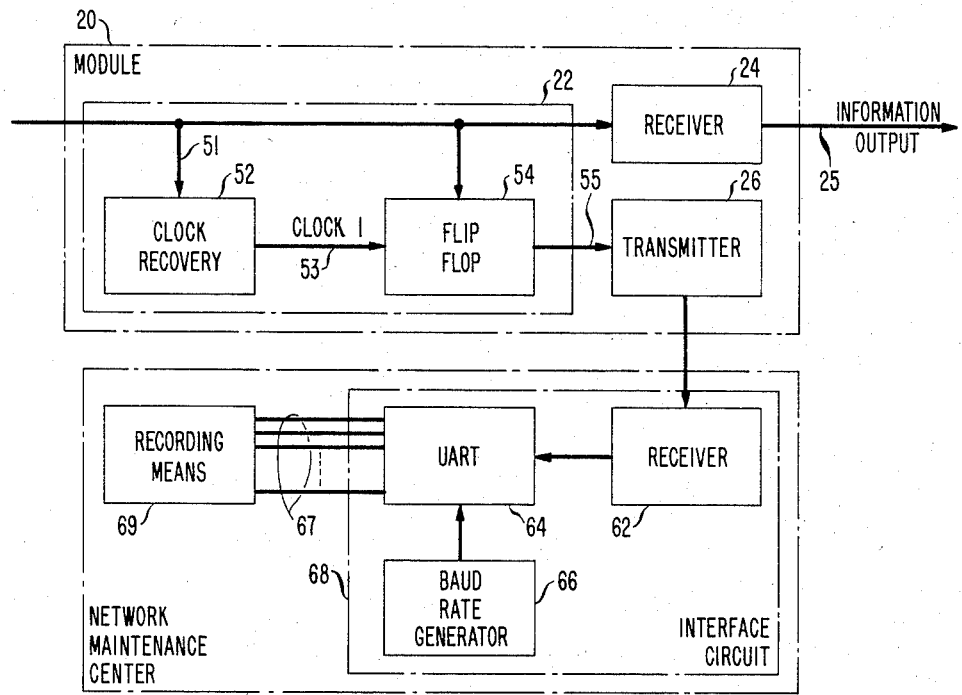
FIG. 5 shows details of the module of FIG. 1 used for receiving the signature bits.

Referring more particularly to FIG. 5, there is shown details of the receiving module 20 of FIG. 1. The clock signal, clock$_1$, is recovered from transmission line 19 over lead 51 at clock recovery circuit 52. In response to the clock signal recovered in circuit 52 and transmitted on lead 53, the signature bits are serially entered in flip-flop 54 and become immediately available at its output lead 55. The transmitter 26 then sends the signature bits serially to the network maintenance center 30.

The signature bits are sent through receiver 62 to the universal asynchronous receiver transmitter UART 64, a standard device, where the signature bits are accumulated. Timing for UART 64 is derived from baud rate generator 66 which is set to correspond with the clock signal, clock$_2$, on lead 41 in FIG. 4, i.e., 300 cycles per second in the illustrative embodiment. The start and stop bits, described above in FIG. 3, indicate the boundary of a byte of signature bits. As each signature byte is assembled in UART 64, it is transmitted, in parallel, over leads 67 to the recording device 69.

Figure 6:
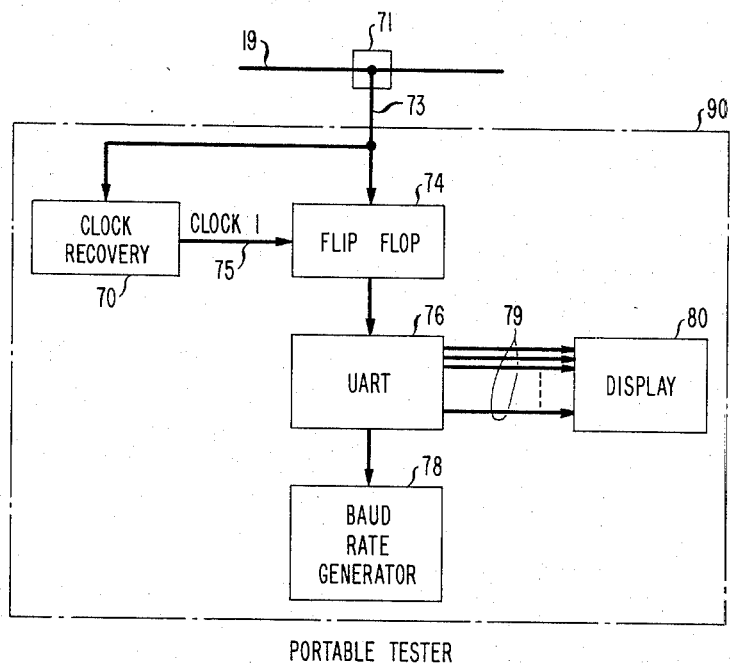
FIG. 6 shows details of a portable test device for visually displaying the signature bits received thereat.

Referring to FIG. 6, there is shown a portable test device 90 useful in detecting the signature of the aforesaid equipment. A maintenance person temporarily attaches probe 71 of the portable test device 90 to the transmission line 19. The signature then becomes visible on display 80. Using the information available at the network maintenance center, the signature is used to identify the location of the equipment at the transmitting end of line 19, in FIG. 1. Because the transmitting end is thus known, the receiving end is identified.

The clock signal, clock$_1$, is recovered from the bit stream in clock recovery circuit 70. In response to the clock signal, clock$_1$, on lead 75, the signature bits are clocked into flip-flop 74. The signature bits are thereafter serially entered in UART 76.

When a byte of signature bits has been accumulated in UART 76, the start and stop bits are discarded, as described in connection with FIG. 5 hereinabove, and the eight signature bits transmitted, in parallel, simultaneously over leads 79 to display 80.

In the illustrative embodiment, digital transmission and multiplexing have been disclosed. This invention could also be implemented by using analog signals instead of digital signals and by using frequency division multiplexing instead of time division multiplexing. In the case of analog transmission, the bits of a signature would be encoded using a technique such as frequency shift keying (FSK).

What is claimed is:

1. Apparatus for use in the maintenance of a telecommunications network comprising
    a first module for periodically transmitting a plurality of signatures for identifying equipment used in said network,
    a second module at a maintenance center for receiving said signatures,
    said first module comprising
    means for transmitting a first stream comprising a plurality of frames of information bits,
    means for periodically generating a plurality of bits representing said signature for said equipment located at said first module, and
    in response to a first clock signal means for sequentially multiplexing one of said signature bits with one of said frames of said first information bit stream to derive a second bit stream.

2. The apparatus according to claim 1 wherein said signature bits comprise a plurality of bytes whereby each of said bytes comprise a start bit, a plurality of said signature bits, and a stop bit.

3. The apparatus according to claim 2 wherein said signature generating means comprises
    means for storing said signature bits, and
    in response to a second clock signal means for periodically and sequentially causing one of said signature bits to be read from said storage means and transmitted to said multiplexing means.

4. The apparatus according to claim 3 wherein a portable tester may be used to receive said signature said portable tester comprising
    means for recovering said first clock signal from said second bit stream,
    means for demultiplexing said second bit stream to derive said signature bits, and
    means for storing each of said signature bits and in response to said first clock signal for transmitting said stored signature bit to a means for accumulating said signature bits and for transmitting said signature bits as one of said bytes to a display unit.

5. The apparatus according to claim 1 wherein said second module comprises
    means for recovering said first clock signal from said second bit stream,
    means for demultiplexing said second bit stream to derive said signature bits,
    means for storing each of said signature bits and in response to said first clock signal for transmitting said stored signature bit to said maintenance center.

6. The apparatus according to claims 2 or 5 wherein said maintenance center comprises
    means for serially receiving said signature bits, and
    means for accumulating said serially received signature bits and for transmitting said signature bits as one of said bytes to a recording device.

7. A method for periodical transmission of a plurality of signatures for identifying equipment used in a telecommunications network to a maintenance center said method comprising the steps of
    generating said signatures at a first module,
    transmitting said signatures from said first module,
    receiving said signatures at a second module,
    accumulating said signatures, and
    transmitting said signatures to a recording device,
    said signature generating step further comprising the steps of periodically generating a plurality of bits representing said signature, and in response to a first clock signal transmitting one of said signature bits to a multiplexing means.

8. The method according to claim 7 wherein said signature transmitting step further comprises the step of in response to a second clock signal multiplexing said signature bits with a plurality of frames of information bits to derive a bit stream, and transmitting said bit stream.

9. The method according to claim 8 wherein said signature receiving step further comprises the steps of deriving said second clock signal from said bit stream, demultiplexing said bit stream, storing said signature bits, and in response to said second clock signal transmitting said signature bits to an accumulating means.

10. The method according to claim 9 wherein said signature accumulating step and said signature transmitting step further comprise the steps of serially accumulating said signature bits, and simultaneously transmitting said accumulated bits in parallel to said recording device.

11. The method according to claim 10 wherein said simultaneous transmission step further comprises the step of transmitting said accumulated bits to a visual display device.

* * * * *